United States Patent

[11] 3,602,740

[72] Inventor Leroy U. C. Kelling
Waynesboro, Va.
[21] Appl. No. 797,926
[22] Filed Feb. 10, 1969
[45] Patented Aug. 31, 1971
[73] Assignee General Electric Company

[54] INFORMATION TRANSMISSION CIRCUIT

17 Claims, 5 Drawing Figs.

[52] U.S. Cl. .......... 307/257, 307/238, 307/246
[51] Int. Cl. .......... H03k 17/00, H03k 5/00
[50] Field of Search .......... 307/246, 238, 261, 265, 237, 257, 227; 328/151, 67, 127

[56] References Cited

UNITED STATES PATENTS

| | | | |
|---|---|---|---|
| 3,213,292 | 10/1965 | Taylor | 307/246 |
| 3,292,010 | 12/1966 | Brown et al. | 328/151 |

FOREIGN PATENTS

| | | | |
|---|---|---|---|
| 247,088 | 3/1961 | Australia | 307/261 |

*Primary Examiner*—Donald D. Forrer
*Assistant Examiner*—B. P. Davis
*Attorneys*—Joseph B. Forman, Frank L. Neuhauser, Oscar B. Waddell, Wm. S. Wolfe and Gerald R. Woods

ABSTRACT: A information transmission circuit for transforming periodic input signals having a duration indicative of the information to be transmitted into a relatively continuous output signal, the amplitude of which is cumulatively changed in accordance with the duration of the periodic signal. The input signals are applied to a first energy storage means or capacitor, and a first gate comprising a diode clamping circuit is connected across the capacitor. A second energy storage means or capacitor is included for developing the output signal, and a second gate comprising a diode clamping circuit is connected from this capacitor to the first gate and first capacitor. In accordance with an additional aspect of the invention, the second gate includes semiconductor switching means comprising first and second transistors for connecting an auxiliary voltage source to the second capacitor which transistors are controlled by the voltage on the first capacitor.

INVENTOR.
LEROY U.C. KELLING
BY Michael Masnik
HIS ATTORNEY

PATENTED AUG 31 1971

3,602,740

INVENTOR.
LEROY U.C. KELLING
BY *Michael Masnik*
HIS ATTORNEY

INVENTOR.
LEROY U.C. KELLING
BY Michael Masnik
HIS ATTORNEY

INFORMATION TRANSMISSION CIRCUIT

BACKGROUND OF THE INVENTION

This invention relates to information transmission circuits and, more particularly, to an electrical circuit of the type wherein the amplitude of a signal on the output thereof is cumulatively changed in accordance with the duration of a periodic signal appearing at the input.

In the transfer of information, a particularly useful circuit is one capable of transferring energy between two storage devices such that the energy appearing in the output of the circuit remains proportional to the energy applied to the input long after that input energy has been removed from the circuit. The duration of time in which the energy is applied to the input is commonly a function of the information to be transmitted. The electrical equivalent of such a circuit could be advantageously utilized in a servosystem for translating pulse-width modulated signals indicative of the time displacement between position command and feedback signals into an amplitude-modulated output signal which is then applied to the input of an operational amplifier in the load control circuit. In prior art arrangements, such desirable characteristics have not been successfully provided, resulting in output signal ripple which required extensive filtering at the expense of servo performance.

The prior art shows passive analog holding circuits including first and second energy storage devices in which at the end of a sampling time the second storage device is switched into this circuit and simultaneously the energy stored in the first device is applied to the second. One problem associated with the prior art arrangements is the maintenance of the proper relationship between the input and output impedances of the circuit so that the energy on the output storage device may remain at a given level for a significant time after the input energy or signal is removed. When such circuits are utilized in fast response servosystems, for example, another problem will arise from residual energy existing in the first storage means at the time a succeeding signal or pulse is applied thereto. The resulting amplitude-modulated output will be distorted and this may cause excessive lags in the servo loop. It would accordingly be more desirable to have such a circuit wherein the input storage device is charged and then, by a suitable switching arrangement, energy is first transferred to the second storage device and then the energy on the first storage device is reduced to zero before the next input signal is received.

Another serious deficiency of the prior art circuits is that the output storage device is charged by energy supplied directly from the input storage device. The result of this is a limitation on the permissible size ratio between the two storage devices if reasonable accuracy is to be preserved. For example, in an electrical embodiment is has been found that if the output capacitor is smaller than the input capacitor by a factor of five or 10 to one, then the output capacitor will charge very close to the potential applied on the input capacitor. It would be advantageous if the energy for charging the output storage device could be drawn from an auxiliary supply and the energy from the input storage device be used merely to control the flow of energy from the auxiliary source to the second storage device. Utilizing the input energy merely for control purposes will result in such a circuit having a considerable power gain. This, in turn, will permit the use of a much larger output storage device. A significant power gain is desirable when such electrical circuits are utilized in servosystems wherein the output of the circuit is connected to an operational amplifier to provide control of a motor.

Furthermore, the present invention achieves a condition in which the output ripple magnitude is a function of only the change in the input signal magnitude and not the value of the magnitude of the signal. Thus, a constant magnitude signal of appreciable magnitude produces an output signal substantially without ripple. The reduction in ripple permits a reduction in the time constants of succeeding ripple filters and hence, faster servosystem response.

SUMMARY OF THE INVENTION

It is, therefore, an object of this invention to provide an information transmission circuit in which the amplitude of the output signal is cumulatively changed as a function of the duration of a periodic signal applied to the input thereof.

It is a more particular object of this invention to provide such a circuit capable of operating free of distortion in a fast response system.

It is a further object of this invention to provide an improved signal processing arrangement.

It is a further object of this invention to provide such a circuit wherein a considerable power gain is obtainable.

Briefly stated, in accordance with one aspect of this invention, there is provided an information transmission circuit having first and second energy storage devices, a first normally closed gate connected across the first energy storage device and a second normally closed gate connected between the two storage devices. An input signal is applied to the first energy storage device to store energy therein in an amount indicative of the information to be transmitted. The second gate is then opened so as to transmit the energy stored in the first device to the second device in which it accumulates so as to provide an output having an amplitude indicative of the information to be transmitted. The first gate is then opened upon the closing of the second gate to reduce to zero the residual energy stored in the first device. In accordance with an additional aspect of this invention, the second gate may be adapted to connect an auxiliary source of energy to the second energy storage device so that upon opening of that gate the energy stored in the first storage device will be utilized merely to control the flow of energy from the auxiliary source to the second energy storage device.

DETAILED DESCRIPTION

This invention is recited in the appended claims. A more thorough understanding of the advantages and further objects of this invention may be obtained by referring to the following description taken in conjunction with the accompanying drawings wherein:

Figure 1:
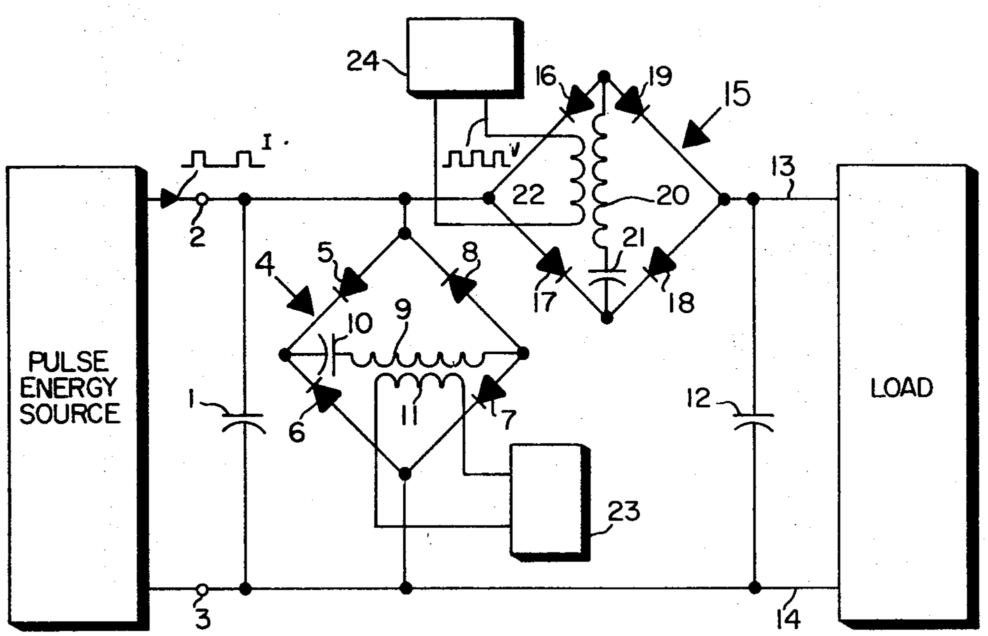
FIG. 1 is a basic representation of an information transmission circuit designed in accordance with this invention.

An information transmission circuit constructed in accordance with this invention is shown in FIG. 1. It includes a first energy storage means comprising capacitor 1 connected across first and second input terminals 2 and 3, respectively. A first normally open diode switching gate 4 comprising first, second, third and fourth unidirectional current conducting means in the form of diodes 5–8, respectively, and having a switching signal receiving branch 9 comprising capacitor 10 and transformer 11 is connected across the first energy storage means or capacitor 1, specifically, to terminals 2 and 3. The information transmission circuit also includes a second energy storage means comprising capacitor 12 connected across circuit output terminals 13, 14. A second normally closed diode switching gate 15 is connected from the second energy storage mans or capacitor 12 to the first gate 4 and the first energy storage means or capacitor 1. In this particular embodiment the second gate 15 is constructed the same as the first gate 4 and thus comprises first, second, third and fourth unidirectional current conducting means or diodes 16–19, respectively, and a switching signal receiving branch 20 comprising capacitor 21 and transformer 22. A set of sequential switching signals from sources 23 and 24 is induced into transformer windings 11 and 22, respectively, to cyclically block and permit conduction of the diode switching gates 4 and 15.

In operation, a source of energy would be connected to the first energy storage means or capacitor 1 for accumulating energy therein in an amount indicative of the information to be transmitted. As will be illustrated in more detail further on in the specification, the source of energy could provide a series of electrical current pulses each having a width indicative of the information to be transmitted. The capacitor 1 will be charged to a potential which is proportional to the pulse width and hence, to the information to be transmitted. Then the gate 15 is momentarily energized by a switching signal from the source 24 and hence, opened so as to allow conduction of energy from the first storage means or capacitor 1 to the second storage means or capacitor 12. The capacitor 12 will be charged to a potential near that on the capacitor 1. More particularly, if the voltage on capacitor 1 is positive, a positive switching signal from source 24 will be applied to the input receiving branch 20 of gate 15 causing diodes 17 and 19 to conduct and thus allow application of the voltage on capacitor 1 to the capacitor 12. The same will happen if the voltage on capacitor 1 is negative. After points 2 and 13 have achieved equal voltage potentials, the switching signal causes the flow of currents through diodes 16 and 18 to be equal to the flow of current through diodes 17 and 19 thereby reducing any charge transfer between capacitors 1 and 12 to zero. Then the switching voltage is reversed to reverse bias the four diodes, and to prevent further current flow until the diode gate is again energized following recharging of input capacitor 1. The potential on capacitor 12 is then essentially fixed and no energy can be discharged from capacitor 12 to a point further back in the circuit. The gate, which acts essentially as a diode clamp, thus isolates the second energy storage means or capacitor 12 from the first or capacitor 1 so as to prevent any significant discharge from the second energy storage means and also to prevent any disturbances in the system from being transmitted through the circuit. Upon closing of the gate 15, the gate 4 is opened by the application of a switching signal from source 23 to the input receiving branch 9 causing diodes 5 and 7 to conduct thus allowing the first energy storage means or capacitor 1 to be discharged to zero. After points 2 and 3 have achieved equal voltage potentials, the switching signal causes the flow of currents through diodes 5 and 7 to be equal to the flow of current through diodes 6 be equal 8 thereby reducing the discharge of capacitor 1 to zero. Then the switching voltage is reversed to reverse bias the four diodes, and to prevent further current flow until the diode gate is again energized following energization of gate 15. Then, when the next pulse having information is applied to the capacitor 1, there will be no residual charge thereon to distort the transmission of information. The provision of these first and second gates and the sequential operation thereof enables the establishment of an essentially clamped and fixed potential on the energy storage means or capacitor 12 connected to the output of the circuit and also the reduction to zero magnitude of the energy in the first storage means or capacitor 1 before the reception of the next input pulse.

Figure 2:
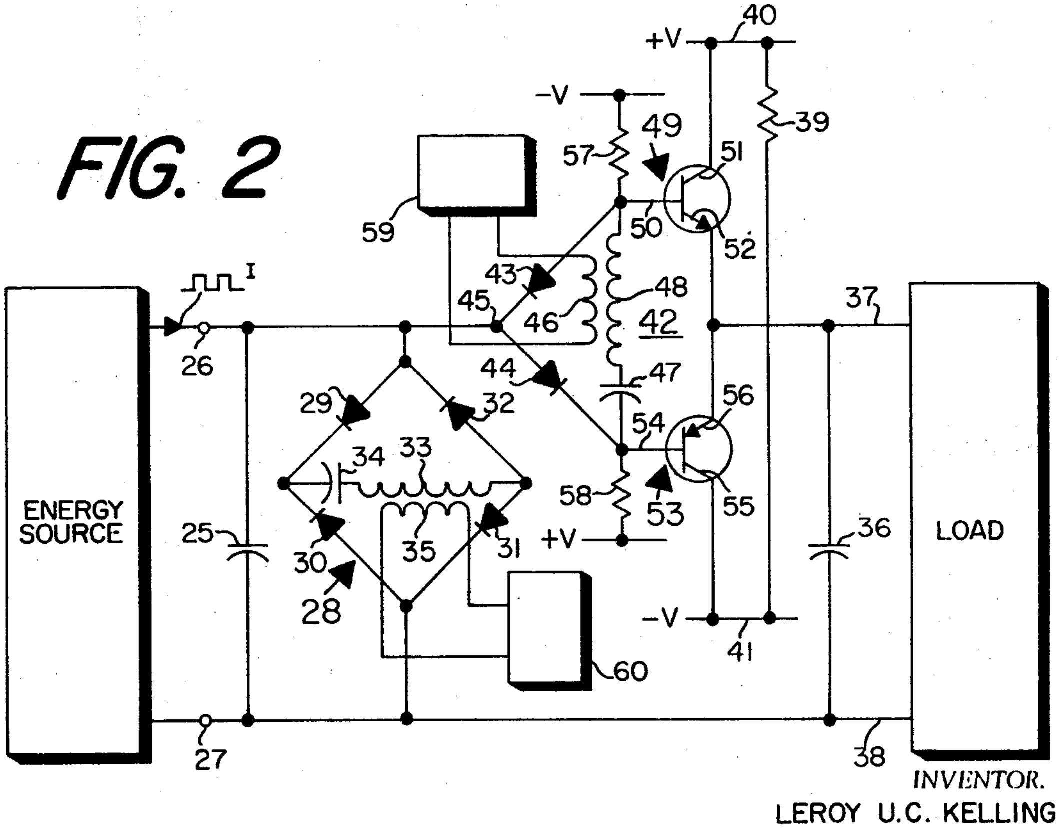
FIG. 2 shows an information transmission circuit similar to that of FIG. 1 and modified in accordance with this invention to provide a significant power gain.

FIG. 2 illustrates an information transmission circuit constructed in accordance with this invention so as to have a significant power gain therethrough. It includes a first energy storage means comprising capacitor 25 connected across input terminals 26, 27. There is also provided a first gate 28 comprising first, second, third and fourth unidirectional current connecting means or diodes 29–32, respectively, and a switching signal receiving branch 33 comprising transformer 35 and capacitor 34. The gate is connected across the first energy storage or capacitor 25, specifically to terminals 26, 27. The construction of this transmission is thus far identical with that of the circuit of FIG. 1.

In accordance with an additional aspect of this invention, the information transmission circuit is designed so that the flow of energy from the first storage means is used merely to control the flow of power from an auxiliary source to a second energy storage means. In particular, the circuit of FIG. 2 also includes a second energy storage means in the form of capacitor 36 connected across output terminals 37, 38. An auxiliary source of energy is provided and in this particular illustration is a two terminal voltage source 39 having first and second levels of voltage on terminals 40 and 41, respectively. A second normally closed gate 42 is connected from the second energy storage means or capacitor 36 to the first gate 28 and to the first energy storage means or capacitor 25, and is adapted to apply the voltage from source 39 to capacitor 36. The gate 42 comprises first and second unidirectional current conducting means or diodes 43 and 44, respectively, joined together at point 45 which is connected to the first gate 28 and to capacitor 25. Connected across the diodes is a switching signal receiving branch 46 comprising capacitor 47 and transformer 48. A first semiconductor switch comprising transistor 49 is connected between the voltage source terminal 40 and capacitor 36 and has a control terminal connected to the first unidirectional current conducting means or diode 43. Specifically, base terminal 50 of transistor 49 is connected to the diode 43 and to the switching signal receiving branch 46, collector terminal 51 of the transistor is connected to voltage source terminal 40, and the emitter terminal 52 is connected to the capacitor 36. Similarly, the gate 42 includes a second semiconductor switch comprising transistor 53 connected between the negative terminal 41 of voltage source 39 and the capacitor 36 and has a control terminal connected to diode 44 and to the switching signal receiving branch 46. Specifically, base terminal 54 of transistor 53 is connected to diode 44 and to switching signal receiving branch 46, collector terminal 55 is connected to voltage source terminal 41 and the emitter terminal 56 is connected to capacitor 36. First and second levels of bias voltage for the transistors 49, 53 are connected through resistor 57 to base terminal 50 of transistor 49 and through resistor 58 to base terminal 54 of transistor 53.

In operation, an input signal would be applied to capacitor 25 so as to cause the accumulation of energy therein in an amount proportional to the information to be transmitted. The gate 42 will then be opened by a switching signal from a source 59 connected to branch 46, and the energy stored in the means 25 or, more specifically, the potential on capacitor 25 will be utilized to control the flow of power from the auxiliary source 39 to the second storage means 36. In particular, assuming that a positive voltage has built up on capacitor 25, a positive switching signal would be applied to the branch 46 causing diode 44 to conduct. Prior to this time resistor 57 had been holding base terminal 50 of transistor 49 at a low potential so as to bias it against conduction. Upon conduction of the diode, however, the positive voltage on the capacitor 25 is applied to the base terminal 50 causing transistor 49 to turn on, thus allowing the voltage from the source 39 to be applied to capacitor 36. The amount of conduction of transistor 49 and hence, the amount of voltage applied to capacitor 36 will be proportional to the voltage appearing on the capacitor 25. Similarly, when a negative voltage accumulates on capacitor 25 a negative switching signal must be applied to input receiving branch 46 causing diode 43 to conduct. Transistor 53, which had been previously back-biased due to the positive potential applied on its base terminal 54, is at this time rendered conducting because of the application of a negative voltage thereon thus causing the voltage of source 39 to be impressed on capacitor 36 in an amount proportional to the voltage appearing on capacitor 25. As the potential of the output capacitor 36 approaches the potential of the input capacitor, then the switching current divides between the diode path 43–44 and the transistor base-emitter input diode path 50–52–56–54 causing the emitter currents through the two transistors to be equal with no net charging effect on the output capacitor 36. After a time sufficient for energy to be stored in the capacitor 36 in the proper amount, the switching signal from source 59 disappears and a signal from source 60 is applied to branch 33 of gate 28 causing it to open and allow conduction of any residue energy from the capacitor 25 in a manner similar to that done by the circuit of FIG. 1.

By virtue of this arrangement, the energy stored on the first means or capacitor 25 is used merely to control the flow of energy from an auxiliary source 39 to the second means or capacitor 36. The significant advantage is a considerable power gain in the circuit which permits the size of capacitor 36 to be larger than heretofore permissible. The larger output capacitor, in turn, will provide a larger magnitude output voltage, the importance of which is evident when the output of the circuit is connected to the input of an amplifier. As in the circuit of FIG. 1, an essentially clamped and fixed potential appears on capacitor 36.

The use of electrical circuits in FIGS. 1 and 2 was to facilitate an understanding of this invention rather than to limit the scope thereof. It is contemplated that other energy media such as fluid flow as well as other energy storage means such as fluid dashpots or electrical flip-flop circuits could be utilized without departing from the scope of the invention.

Figure 3:
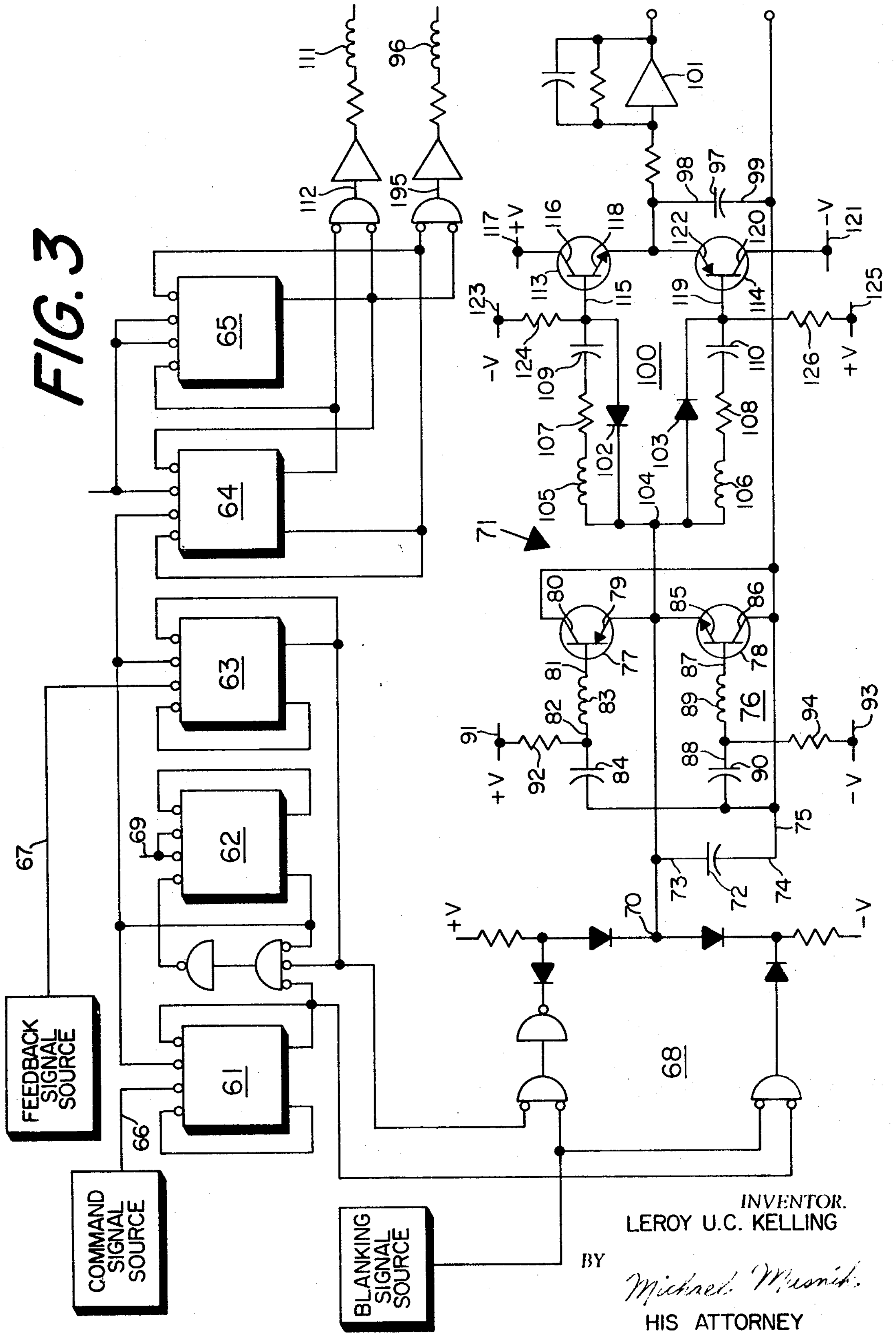
FIG. 3 shows a portion of a servo control system utilizing a circuit contemplated by this invention.

FIG. 3 illustrates an application of the information transmission circuit shown in FIGS. 1 and 2 to a servo control system. The circuit functions, briefly, to transform pulses having a width indicative of the time displacement between the command and feedback phase signals into an amplitude-modulated output which is applied to the input of an operational amplifier connected to the motor control. The circuit of FIG. 3 includes five flip-flop circuits 61–65 which accept the command and feedback signals appearing on lines 66 and 67, respectively, and produce a pulse-width modulated current out of the diode switching gates indicated generally at 68. More particularly, a command phase signal is applied through line 66 to flip-flop 61, a feedback signal is applied through line 67 to flip-flop 63, and a clock signal is applied through line 69 to flip-flop 62. In the system shown, when the command signal lags the feedback signal in phase, the current flowing from the output of the diode switching gate 68 will be positive, and when the command signal leads the feedback signal in phase, the current will be negative. The current flowing to the right from point 70 is a series of pulses having a width proportional to the magnitude of the time difference between the command and feedback signals and a polarity indicative of the phase relationship. These current pulses are metered by resistors 92 and 94 to have essentially constant magnitude of current. The remaining flip-flops provide a transfer of the cycle of operations, and the outputs of these flip-flops are connected to the gates of the transmission circuit as will be explained.

The information transmission circuit 71 incorporated in this servo control system comprises a first energy storage means in the form of capacitor 72 having terminals 73, 74. Terminal 73 is connected to point 70 or the output of the diode switching gate 68, and terminal 74 is connected to a low potential line 75 of the system. The circuit also includes a first gate 76, the function of which is to discharge the capacitor 72 in a manner similar to that done by the gate circuits of FIGS. 1 and 2. It comprises first and second semiconductor switches or transistors 77 and 78, respectively, connected across the capacitor 72. Each of the switches has a control terminal connected to the switching signal receiving branch. In particular, the first switch or transistor 77 has an emitter terminal 79 connected to terminal 73 of capacitor 72 and a collector terminal 80 connected to the low potential line 75. The base terminal 81 is connected to a first switching signal receiving branch 82 for this gate comprising a transformer secondary coil 83 and a capacitor 84. Likewise, the second switch or transistor 78 has an emitter terminal 85 connected to terminal 73 of capacitor 72 and a collector terminal 86 connected to the low potential line 75. The base terminal 87 of this transistor is connected to a second switching signal receiving branch 88 including a transformer secondary coil 89 and a capacitor 90. The capacitors 84 and 90 included within each of the branches 82 and 88, respectively, are connected together to the low potential line 75. A source of positive bias voltage 91 is connected through a resistor 92 and coil 83 to base terminal 81 of the transistor 77 so as to normally bias it against conduction; and, similarly, a source of negative bias voltage 93 is connected through a resistor 94 and secondary coil 89 to base terminal 87 of transistor 78 to likewise normally back-bias it. The output of flip-flop 65 is connected through suitable gating logic 95 to a transformer primary coil 96 which is coupled to the transformer secondary coils 83, 89. A pulse output generated by flip-flop 65 is the switching signal which is applied to the gate 76.

The information transmission circuit 71 also includes a second energy storage means in the form of capacitor 97 having terminals 98 and 99. Terminal 99 is connected to the low potential line 75 and terminal 98 of capacitor 97 is connected through a second gate 100 to terminal 73 of capacitor 72. The potential which appears on capacitor 97 is applied as an input to an operational amplifier 101, the output of which is transmitted to the motor control portion of the servosystem.

Gate 100 is constructed in a manner similar to the second gate 42 included in the circuit of FIG. 2. It functions to allow the energy on the first storage means to control the flow of power from an auxiliary source to the second energy storage means and thus provide considerable power gain from input to output. The gate 100 includes first and second unidirectional current conducting means or diodes 102, 103 which are connected together at point 104 to the first storage means, in particular to terminal 73 of capacitor 72. First and second switching signal receiving branches are connected across diodes 102 and 103, respectively, comprising first and second transformer secondary coils 105 and 106, respectively, first and second resistors 107 and 108, respectively, and first and second capacitors 109, 110, respectively. The transformer secondary coils 105 and 106 are coupled to a primary coil 111 for receiving a switching signal developed by flip-flop 64 and logic circuitry 112. Gate 100 also includes first and second semiconductor switches comprising transistors 113 and 114, respectively, for connecting an auxiliary source of energy to the second energy storage means or capacitor 97, each switch having a control terminal connected to the first and second unidirectional current conducting means or diodes 102 and 103, respectively. In particular, base terminal 115 of transistor 113 is connected to diode 102 and to the capacitor 109 included in the switching signal receiving branch. The collector terminal 116 is connected to the positive terminal 117 of the auxiliary voltage source and emitter terminal 118 is connected to terminal 98 of capacitor 97. Likewise, base terminal 119 of transistor 114 is connected to diode 103 and capacitor 110, collector terminal 120 is connected to terminal 121 of the auxiliary voltage source, and emitter terminal 122 is connected to terminal 98 of capacitor 97. Transistor 113 is normally biased against conduction by a source of negative bias voltage 123 applied to base terminal 115 through a resistor 124, and transistor 114 is likewise back-biased by a source of positive bias voltage 125 applied to base terminal 119 through resistor 126.

In operation, the pulse width modulated current flowing from point 70 will charge capacitor 72 to a potential indicative of the magnitude of the time difference between the command and feedback signals which potential has a polarity indicative of the phase relationship between the two signals. Next, the flip-flop 62 will activate flip-flop 64, the output of which appears in transformer primary coil 111 and is coupled to secondary coils 105, 106 so as to provide a switching signal to gate 100. The pulse appearing in either of the transformer secondaries 105, 106 results in the opening of gate 100 which allows the potential on capacitor 72 to control the flow of power from the auxiliary source to the energy storage means or capacitor 97. More particularly, the occurrence of a switching signal in transformer secondary winding 105 causes diode 102 to conduct thus applying the potential of capacitor 73 at the base 115 of transistor 113. This turns on the transistor 113 allowing a flow of current from the positive terminal 117 of the auxiliary source to the capacitor 97. If, on the other hand, the input pulse from point 70 were negative so as to charge capacitor 72 to a negative potential, the conduction of diode 103 would allow application of a negative potential to base terminal 119 of transistor 114 and the charging of capacitor 97 from the negative voltage terminal 121. Thereafter, flip-flop 65 is activated to provide an output in transformer primary coil 96 which is coupled to the secondary coils 83, 89 in gate 76. Depending upon the polarity of the voltage on capacitor 72, one of the transistors 77, 78, which had been previously back-biased, would be rendered conducting so as to allow the discharge of capacitor 72. The information transmission circuit 71 will then be ready to receive the next current pulse from the diode switching gate 68.

Figure 4A:
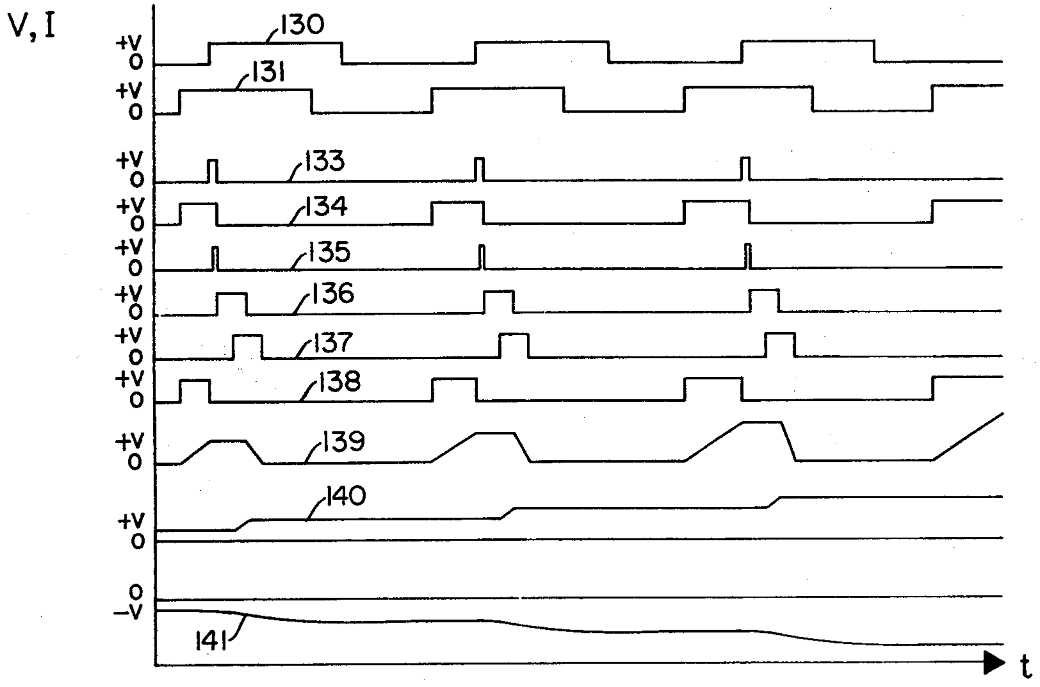
FIGS. 4*a* and 4*b* show waveforms which occur at various points in the circuit of FIG. 3.
Figure 4B:
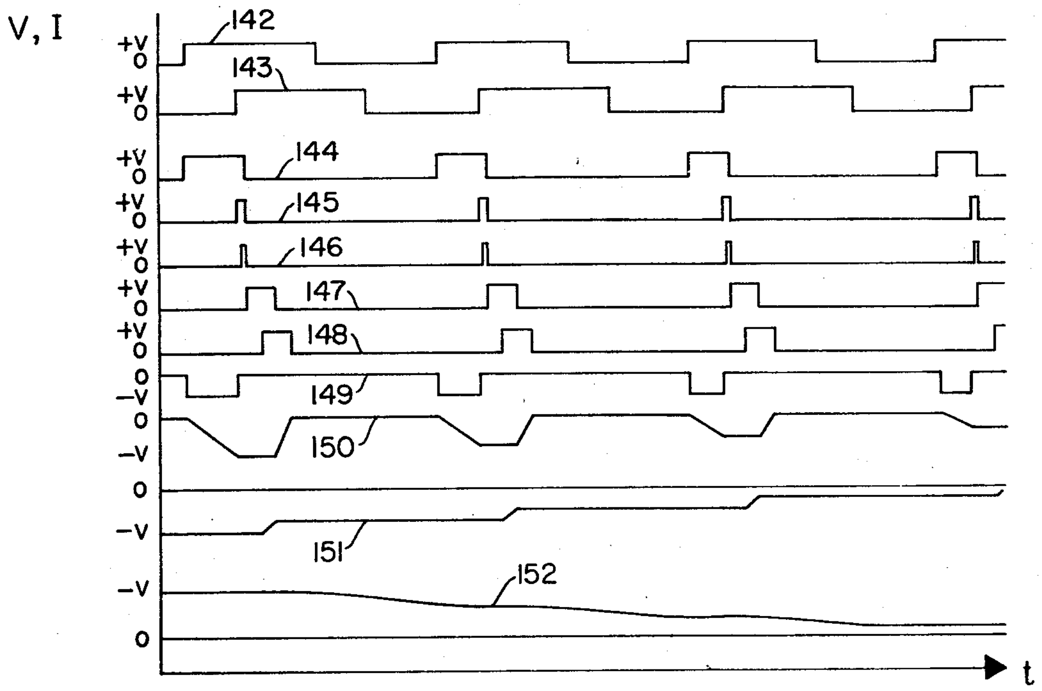

The operation of the circuit of FIG. 3 may be more fully understood by examining the waveforms in FIGS. 4*a* and 4*b* which appear at various at various points in the circuit of FIG. 3.

FIG. 4*a* shows voltage and current as a function of time with the command signal lagging the feedback signal in phase and with the position error or the time displacement between the two signals increasing. Waveform 130 indicates the command signal pulses which are applied over line 66 to flip-flop 61. Waveform 131 indicates the feedback signal applied through line 67 to flip-flop 63. A comparison of the two will reveal that the time at which the feedback pulse appears becomes progressively earlier relative to the time at which the command pulse appears so that the command phase is lagging and the position error is increasing. Waveform 133 represents the time occurrence of an output from flip-flop 61 which sets whenever the command pulse 130 is positive going and resets a little after the time the feedback pulse 131 is present. Waveform 134 represents the output of flip-flop 63 which is set by the presence of the feedback signal 131. Waveform 135 indicates the output of flip-flop 62 which generates a reset pulse on the next clock pulse following the time at which flip-flops 61 and 63 are both set. Waveform 136 indicates the output of flip-flop 64 which is present upon the occurrence of an output from flip-flop 62 and having a predetermined duration indicated by the input to the flip-flop. Similarly, waveform 137 indicates the output of flip-flop 65 which is essentially the same as that of flip-flop 64 but delayed in time by a predetermined amount. The current flowing from the diode switching gate 68 is represented by waveform 138, and it should be noted that these current pulses have a duration corresponding to the magnitude of the time displacement between the command and feedback signals. Waveform 139 shows the voltage taken on capacitor terminal 73, and it will be seen that the rise time of this voltage waveform is equal to the duration of the current pulse shown by waveform 138. The decay of this voltage, which corresponds to the discharging of the capacitor 72, occurs at a time corresponding to the set condition of flip-flop 65 and the reset condition of flip-flop 64.

Waveform 140 represents the voltage measured at terminal 98 of capacitor 97 and is essentially a continuous voltage level which builds up stepwise, with the buildup points occurring at a time immediately following the initiation of the output from flip-flop 65. Immediately following the reset of flip-flop 64, a pulse is sent to gate 76 so as to discharge capacitor 72. Finally, waveform 141 is the voltage output of the operational amplifier 101 which is a voltage level gradually increasing with time.

FIG. 4*b* presents voltage and current waveforms as a function of time which occur when the command signal leads the feedback signal in phase and when the position error is decreasing. Waveform 142 is the signal appearing on line 66 and waveform 143 is the feedback signal appearing on line 67. The command pulses appear at times earlier in the cycle than the feedback pulses but the magnitude of the time difference decreases with increasing time, as can be seen from FIG. 4*b*. Waveform 144 indicates the output of flip-flop 61 which has a duration approximately equal to the time difference between the command and feedback signals. The output of flip-flop 63, shown the waveform 145, is a short duration pulse which occurs when the feedback signal does positive during the time that flip-flop 61 is set. A similar but narrower width waveform 146 is shown for the output of flip-flop 62 which is used to reset flip-flops 61 and 63 and set flip-flop 64. Waveform 147 indicates the output of flip-flop 64 which is initiated when the output of flip-flop 61 goes negative and has a duration determined by a reset signal. Likewise, waveform 148 indicates the output of flip-flop 65 which is displaced in time slightly from the output of flip-flop 64. Waveform 149 indicates the current pulses flowing out of the diode switching network 68, and in this particular example with the command phase leading, the pulses will be negative. The pulses likewise have a duration corresponding to the relative time difference between the command and feedback signals. Waveform 150 indicates the voltage appearing at terminal 73 of capacitor 72 and has a rise time equal to the duration of the current pulse shown by waveform 149. The decay of the waveform 150 is initiated at the point immediately following the reset of the flip-flop 64. Waveform 151 presents the voltage taken from terminal 98 of capacitor 97 and becomes increasingly less negative in steps having transition points corresponding to the positive going portions of the output of flip-flop 65. Finally, waveform 152, taken at the output of the operational amplifier 101, is a positive voltage which decreases gradually in amplitude over time.

While the invention has been described with specificity, it is the aim of the appended claims to cover all such variations as come within the spirit and scope of the foregoing disclosure.

What I claim as new and desire to secure by Letters Patent of the Unites States is:

1. An information transmission circuit comprising:
   a. first energy storage means;
   b. a source of energy connected to said first energy storage means for accumulating energy in said first energy storage means in an amount indicative of the information to be transmitted;
   c. a first normally closed gate adapted to be opened for conduction in response to a switching signal;
   d. said first normally closed gate being connected in parallel with said first energy storage means;
   e. second energy storage means;
   f. a second normally closed gate adapted to be opened for conduction in response to a switching signal;
   g. an auxiliary source of energy;
   h. said second normally closed gate being connected to said auxiliary source of energy, said second energy storage means, said first normally closed gate and said first energy storage means; and
   i. a source of switching signals connected to said first and second normally closed gates for sequentially opening said second and first gates, respectively, whereby energy will first be transferred from said auxiliary source to said second energy storage means in an amount proportional to the amount stored in said first energy storage means and energy stored in said first energy storage means will then be reduced to zero.

2. The circuit recited in claim 1 wherein said auxiliary source of energy comprises a voltage source having first and second terminals.

3. The circuit recited in claim 2 wherein said second normally closed gate comprises:
   a. first and second unidirectional current conducting means connected to said first normally closed gate and to said first energy storage means;
   b. a switching signal receiving branch connected across said first and second unidirectional current conducting means;
   c. a first semiconductor switch connected between said first terminal of said voltage source and said second energy storage means and having a control terminal connected to said first unidirectional current conducting means; and
   d. a second semiconductor switch connected between said second terminal of said voltage source and said second energy storage means and having a control terminal connected to said second unidirectional current conducting means.

4. In a control system:

a. a source of command signals representing a commanded operation;
b. a source of feedback signals representing an actual response to the command signals;
c. means connected to said sources for forming pulses wherein the width of each pulse varies in direct proportion to the time displacement between the command and feedback signals;
d. a first energy storage means;
e. means for applying said pulses to said first energy storage means;
f. a first normally closed gate adapted to be opened for conduction in response to a switching signal, said gate being connected in parallel with said first energy storage means;
g. a second energy storage means;
h. a second normally closed gate adapted to be opened for conduction in response to a switching signal, said gate being connected between said first and said second energy storage means; and
i. a source of switching signals connected to said first and second gates for sequentially opening said first and second gates for conduction to accumulate energy on said second energy storage means in proportion to the integral of energy applied to said first energy storage means.

5. The circuit recited in claim 4 wherein said first and second energy storage means comprise first and second capacitors, respectively, each having first and second terminals.

6. The circuit recited in claim 5 wherein said first normally closed gate comprises:
a. first and second semiconductor switching means each connected across said first capacitor and each having a control terminal; and
b. a switching signal receiving branch connected to said control terminals of said first and second semiconductor switches and to said capacitor.

7. The circuit recited in claim 4 wherein said first normally closed gate comprises, first, second, third and fourth unidirectional current conducting means arranged in a bridge configuration and a switching signal receiving branch connected across the bridge junctions which are not connected in said circuit.

8. The circuit recited in claim 7 wherein said unidirectional current conducting means each comprises a diode having an anode and a cathode and said switching signal receiving branch comprises a transformer.

9. The circuit recited in claim 8 wherein said first, second, third and fourth diodes and said capacitor and transformer are connected together to form a clamping circuit.

10. The circuit recited in claim 4 wherein said second normally closed gate comprises first, second, third and fourth unidirectional current conducting means arranged in a bridge configuration and a switching signal receiving branch connected across the bridge junctions which are not connected in said circuit.

11. The circuit recited in claim 10 wherein said unidirectional current conducting means each comprises a diode having an anode and a cathode and said switching signal receiving branch comprises a transformer.

12. The circuit recited in claim 11 wherein said first, second, third and fourth diodes and transformer are connected together to form a clamping circuit.

13. In a control system wherein the magnitude of time displacement between command and feedback signals is utilized to control the integrated amount of current flowing through a load, means for transforming electrical pulses having a width indicative of the time displacement between the command and feedback signals into a voltage output which cumulatively changes in amplitude in accordance with the width of said pulses comprising:
a. a first energy storage means;
b. means for applying said pulses to said first energy storage means;
c. a first normally closed gate adapted to be opened for conduction in response to a switching signal;
d. said first normally closed gate being connected in parallel with said first energy storage means;
e. second energy storage means;
f. a second normally closed gate adapted to be opened for conduction in response to a switching signal;
g. an auxiliary source of energy;
h. said second normally closed gate being connected to said auxiliary source of energy, said second energy storage means, said first normally closed gate and said first energy storage means; and
i. a source of switching signals connected to said first and second normally closed gates for sequentially closing said second and first gates, respectively, whereby energy will first be transferred from said auxiliary source to said second energy storage means in an amount proportional to the amount stored in said first energy storage means and energy stored in said first energy storage means will then be reduced to zero.

14. The circuit recited in claim 13 wherein said auxiliary source of energy comprises a voltage source having first and second terminals.

15. The circuit recited in claim 14 wherein said second normally closed gate comprises:
a. first and second unidirectional current conducting means connected to said first normally closed gate and to said first energy storage means;
b. a switching signal receiving branch connected across said first and second unidirectional current conducting means;
c. a first semiconductor switch connected between said first terminal of said voltage source and said second energy storage means and having a control terminal connected to said first unidirectional current conducting means; and
d. a second semiconductor switch connected between said second terminal of said voltage source and said second energy storage means and having a control terminal connected to said second unidirectional current conducting means.

16. A circuit for processing voltage signals available from a two terminal source comprising:
a. a two terminal energy storage means;
b. a normally closed gate adapted to be opened for conduction in response to a switching signal;
c. said normally closed gate being connected between one terminal of energy storage means and one terminal of said voltage signal source;
d. an auxiliary source of energy connected to said normally closed gate whereby energy will be accumulated in said energy storage means from said auxiliary source upon the closing of said gate and in an amount determined by the instantaneous voltage of the signals available from said source;
e. said auxiliary source of energy comprising a voltage source having first and second terminals;
f. said gate comprising a first and a second two terminal unidirectional current conducting means;
g. a switching signal circuit connected between one terminal of each of said first and second unidirectional current conducting means;
h. means for connecting the other terminals of said unidirectional current conducting means to said one terminal of said voltage signal source;
i. means for connecting the other terminals of said voltage signal source and said energy storage means;
j. a first semiconductor switch connected between said first terminal of said voltage source and said one terminal of said energy storage means and having a control terminal connected to said one terminal of said first unidirectional current conducting means; and
k. a second semiconductor switch connected between said second terminal of said voltage source and said one terminal of said energy storage means and having a control terminal connected to said one terminal of said second unidirectional current conducting means, said normally closed gate responsive to switching signals for causing said first and second semiconductor switches to conduct in the direction and in an amount to charge said energy storage means to a voltage magnitude equal to the magnitude of the voltage available from said source.

17. A circuit for processing voltage signals available from a source comprising:

a. energy storage means;

b. a normally closed gate adapted to be opened for conduction in response to a switching signal;

c. said normally closed gate being connected to said energy storage means and to said voltage signal source;

d. an auxiliary source of energy connected to said normally closed gate whereby energy will be accumulated in said energy storage means from said auxiliary source upon the closing of said gate and in an amount determined by the instantaneous voltage of the signals available from said source;

e. said auxiliary source of energy comprising a voltage source having first and second terminals;

f. said gate comprising first and second unidirectional current conducting means connected to said source of voltage signals;

g. a switching signal receiving branch connected across said first and second unidirectional current conducting means;

h. a first semiconductor switch connected between said first terminal of said voltage source and said energy storage means and having a control terminal connected to said first unidirectional current conducting means;

i. a second semiconductor switch connected between said second terminal of said voltage source and said energy storage means and having a control terminal connected to said second unidirectional current conducting means; and j. said normally closed gate responsive to switching signals for causing said first and second semiconductor switches to conduct in the direction and in an amount to charge said energy storage means to a voltage magnitude equal to the magnitude of the voltage available from said source.